US011295053B2

United States Patent
Xu et al.

(10) Patent No.: US 11,295,053 B2
(45) Date of Patent: Apr. 5, 2022

(54) DIELET DESIGN TECHNIQUES

(71) Applicant: Arm Limited, Cambridge (GB)

(72) Inventors: Xiaoqing Xu, Austin, TX (US); Brian Tracy Cline, Austin, TX (US); Saurabh Pijuskumar Sinha, San Antonio, TX (US); Stephen Lewis Moore, Austin, TX (US); Mudit Bhargava, Austin, TX (US)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/569,482

(22) Filed: Sep. 12, 2019

(65) Prior Publication Data

US 2021/0081508 A1   Mar. 18, 2021

(51) Int. Cl.
| | |
|---|---|
| *G06F 30/394* | (2020.01) |
| *G06F 30/392* | (2020.01) |
| *G06F 30/327* | (2020.01) |
| *G06F 111/20* | (2020.01) |

(52) U.S. Cl.
CPC .......... *G06F 30/394* (2020.01); *G06F 30/327* (2020.01); *G06F 30/392* (2020.01); *G06F 2111/20* (2020.01)

(58) Field of Classification Search
CPC ...... G06F 16/2379; G06F 30/30; G06F 30/39; G06F 30/392; G06F 30/394; G06F 30/327; G06F 2111/20; G06F 3/061; G06F 3/064; G06F 8/443; G06F 11/1453
See application file for complete search history.

(56) References Cited

U.S. PATENT DOCUMENTS

| | | | | |
|---|---|---|---|---|
| 4,841,355 A | * | 6/1989 | Parks | H01L 25/105 257/686 |
| 5,412,762 A | * | 5/1995 | Kondo | G06T 17/00 345/420 |
| 5,744,827 A | * | 4/1998 | Jeong | H01L 23/4951 257/686 |
| 6,014,313 A | * | 1/2000 | Hesselbom | H01L 25/0652 174/16.3 |
| 6,172,687 B1 | * | 1/2001 | Kitamura | G06F 12/0207 345/564 |
| 6,301,247 B1 | * | 10/2001 | Larson | H04L 49/1515 370/386 |
| 6,525,725 B1 | * | 2/2003 | Deering | G06T 3/0093 345/419 |

(Continued)

OTHER PUBLICATIONS

Lewis et al.; "Testing Circuit-Partitioned 3D IC Designs"; 2009 IEEE Computer Society Annual Symposium on VLSI; Conference Paper; Publisher: IEEE (Year: 2009).*

(Continued)

*Primary Examiner* — Helen Rossoshek
(74) *Attorney, Agent, or Firm* — Pramudji Law Group PLLC; Ari Pramudji

(57) ABSTRACT

Various implementations described herein are directed to an integrated circuit (IC) having a design that is severable into multiple sub-circuits having input-output (IO) ports. The integrated circuit (IC) may include multiple physical electrical connections that are adapted to electrically interconnect the IO ports of the multiple sub-circuits to operate as the IC, and the IO ports have three-dimensional (3D) geometric position information associated therewith.

20 Claims, 9 Drawing Sheets

(56) References Cited

U.S. PATENT DOCUMENTS

| | | | | |
|---|---|---|---|---|
| 7,994,623 | B2* | 8/2011 | Nonomura | H01L 25/18 257/686 |
| 8,046,727 | B2* | 10/2011 | Solomon | G06F 30/30 716/116 |
| 8,407,660 | B2* | 3/2013 | Solomon | G06F 15/803 716/138 |
| 8,566,762 | B2* | 10/2013 | Morimoto | H01L 27/0211 716/102 |
| 8,698,140 | B2* | 4/2014 | Ito | G01R 31/318536 257/48 |
| 8,732,647 | B1* | 5/2014 | Rusu | G06F 30/394 716/126 |
| 8,754,533 | B2* | 6/2014 | Or-Bach | H01L 27/105 257/777 |
| 8,793,636 | B2* | 7/2014 | Alpert | G06F 30/392 716/119 |
| 8,850,380 | B2* | 9/2014 | Bickford | G06F 30/39 716/136 |
| 9,013,235 | B2* | 4/2015 | Kamal | H01L 27/0688 327/565 |
| 9,093,129 | B2* | 7/2015 | Zhang | G11C 5/02 |
| 9,136,153 | B2* | 9/2015 | Or-Bach | H01L 21/76254 |
| 9,153,324 | B2* | 10/2015 | Parker | G11C 16/12 |
| 9,160,274 | B2* | 10/2015 | Hsieh | H01L 21/823431 |
| 9,172,373 | B2* | 10/2015 | Gorman | H03K 19/00392 |
| 9,432,298 | B1* | 8/2016 | Smith | H04L 49/9057 |
| 9,543,373 | B2* | 1/2017 | Liang | H01L 24/24 |
| 9,553,348 | B2* | 1/2017 | Dewitt | H01P 1/203 |
| 9,711,407 | B2* | 7/2017 | Or-Bach | H01L 23/544 |
| 10,037,931 | B2* | 7/2018 | DeWitt | H01P 3/026 |
| 10,546,393 | B2* | 1/2020 | Ray | G06F 12/023 |
| 10,657,218 | B2* | 5/2020 | Prasad | G06F 30/394 |
| 11,152,336 | B2* | 10/2021 | Teig | H01L 25/0657 |
| 2013/0256908 | A1* | 10/2013 | Mclaurin | H01L 21/50 257/774 |
| 2015/0009743 | A1* | 1/2015 | Chung | G11C 17/16 365/96 |
| 2015/0054595 | A1* | 2/2015 | Dewitt | G06F 30/394 333/117 |
| 2016/0027760 | A1* | 1/2016 | Yu | H01L 24/83 257/741 |
| 2017/0092621 | A1* | 3/2017 | Das | H01L 23/481 |
| 2018/0005996 | A1* | 1/2018 | Fu | G06F 30/39 |
| 2018/0031763 | A1* | 2/2018 | Ellwood, Jr. | G02B 6/12002 |
| 2018/0046908 | A1* | 2/2018 | Cox | G06F 3/06 |
| 2018/0132056 | A1* | 5/2018 | Leedy | H01L 27/108 |
| 2018/0225406 | A1* | 8/2018 | Jain | G06F 30/394 |
| 2018/0330993 | A1* | 11/2018 | DeLaCruz | H01L 25/0657 |
| 2018/0350775 | A1* | 12/2018 | DeLaCruz | H01L 24/09 |
| 2019/0057177 | A1* | 2/2019 | Trujillo | G06F 30/394 |
| 2019/0258767 | A1* | 8/2019 | Young | G06F 30/394 |
| 2019/0279855 | A1* | 9/2019 | Kuramoto | H01J 49/164 |
| 2020/0402990 | A1* | 12/2020 | Nishikawa | H01L 24/48 |
| 2020/0409592 | A1* | 12/2020 | Yang | H01L 27/11556 |

OTHER PUBLICATIONS

Liu et al.; "A Compact Low-Power 3D I/O in 45nm CMOS"; 2009 IEEE Computer Society Annual Symposium on VLSI; Conference Paper; Publisher: IEEE (Year: 2012).*

Mentor Graphics; 3D-IC Design and Test; https://www.mentor.com/solutions/3d-ic-design/ ; printed May 3, 2019.

Cadence Design Systems; Cadence 3D-IC Design Solutions; https://www.cadence.com/content/cadence-www/global/en_US/home/solutions/3dic-design-solutions.html ; printed May 3, 2019.

Synopsys, Inc.; Synopsys Design Platform Enabled for TSMC's Multi-die 3D-IC Advanced Packaging Technologies; https://news.synopsys.com/2018-10-03-Synopsys-Design-Platform-Enabled-for-TSMCs-Multi-die-3D-IC-Advanced-Packaging-Technologies ; Oct. 3, 2018.

Chang, et al.; Cascade2D: A Design-Aware Partitioning Approach to Monolithic 3D IC with 2D Commercial Tools; International Conference on Computer-Aided Design (ICCAD); 2016.

PCT International Search Report and Written Opinion; PCT/GB2020/050811; dated Jul. 3, 2020.

Knechtel, et al.; Planning Massive Interconnects in 3-D Chips; IEEE Transactions on Computer-Aided Design of Integrated Circuits and Systems; vol. 34, No. 11; pp. 1808-1821; Nov. 2015. DOI: 10.1109/TCAD.2015.2432141.

Fischbach, et al.; 3D Physical Design: Challenges and Solutions; May 2011.

Zhou, et al.; CASCADE: A Standard Supercell Design Methodology with Congestion-Driven Placement for Three-Dimensional Interconnect-Heavy Very Large-Scale Integrated Circuits; IEEE Transactions on Computer-Aided Design of Integrated Circuits and Systems; vol. 26, No. 7; pp. 1270-1282; Jul. 2007. DOI: 10.1109/TCAD.2006.888266.

* cited by examiner

DIELET DESIGN TECHNIQUES

BACKGROUND

This section is intended to provide information relevant to understanding the various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In conventional circuit designs, semiconductor chips and/or dies typically have many electrical connections between on-chip circuit components. Unfortunately, some of these electrical connections can be difficult to design and implement in three-dimensional (3D) space due to multi-tier layering and multi-chip implementations. As such, there exists a need to improve physical design implementation of electrical connections between on-chip circuit components for multi-tier layering and multi-chip implementations.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Figure 1A:
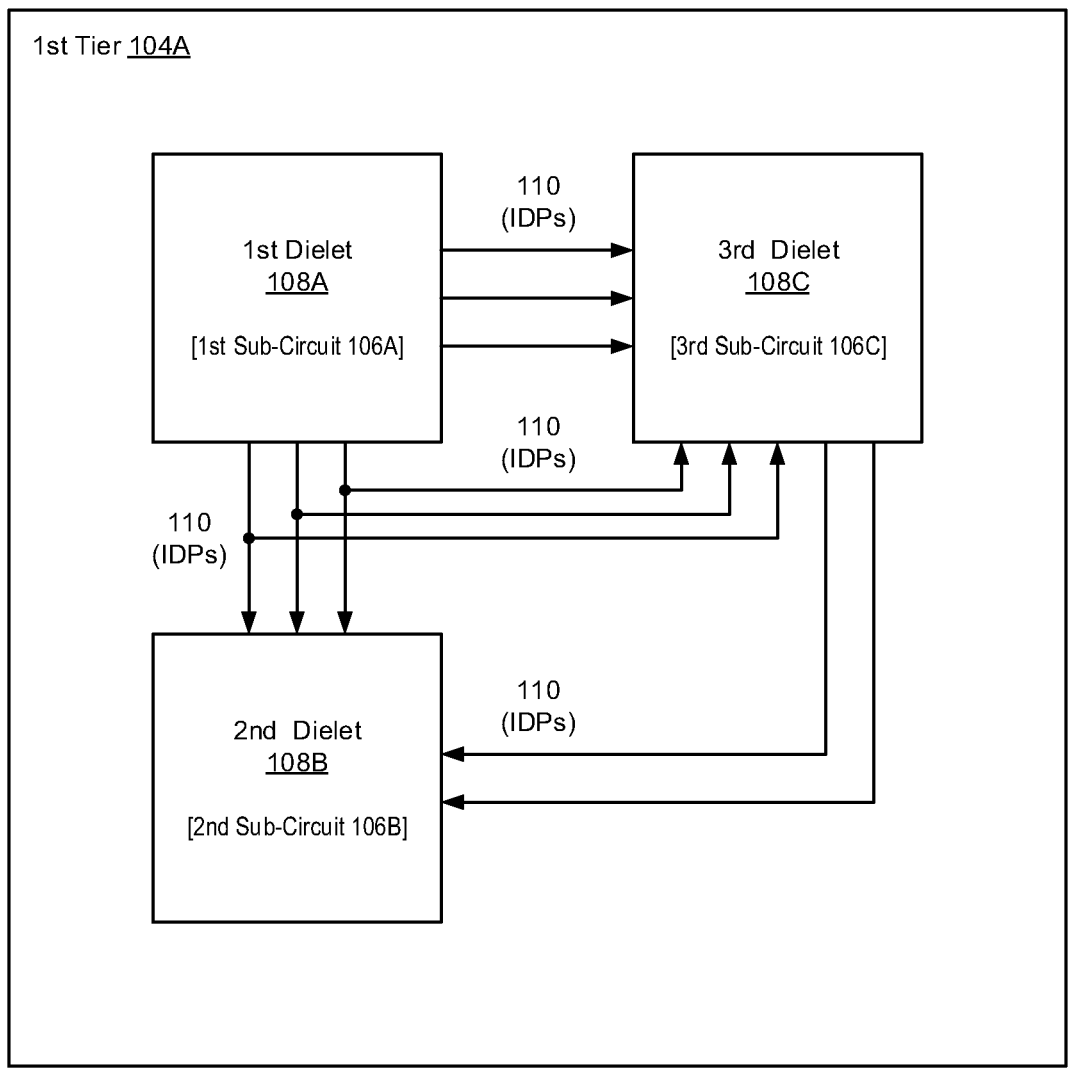
FIGS. 1A-1C illustrate various diagrams of an integrated circuit chip having one or more tiers in accordance with implementations described herein.

Various implementations described herein are directed to integrated circuit (IC) chips and dies including dielet design schemes and techniques for implementing multi-dielet design methodologies. The various schemes and techniques described herein may provide for unified database methodologies in reference to multi-dielet chip design, which may provide for one or more or all dielet type design instances across multiple dielets that are incorporated into a unified database for concurrent design optimizations. Various sub-components, blocks and/or designs that pertain to a single die may be disassembled into separate dielets for die optimizations with associated constraints. These separate dielets may be reassembled into a unified database at any stage of design flow, and this unified database methodology may be applicable to various multi-dielet chip technology, such as, e.g., printed circuit board (PCB) multi-chip modules (MCM), 2.5D packaging (e.g., Si interposer or UCLA Silicon-interconnect fabric, etc.), wafer bonding and through-silicon via (TSV) based three-dimensional (3D) designs, and monolithic 3D designs. In various instances, a dielet may refer to a sub-component of a circuit design, a die sub-divided into multiple blocks, and/or an implementable grouping under certain technologies.

The various schemes and techniques described herein may provide for inter-dielet ports (IDPs) in physical design that facilitate integration of a system or a portion of a system that is implemented on physically different dies (or chips). In some instances, these IDPs may have 3D geometric position information associated therewith, and the system or the portion of system is described in a unified design database. Also, the system may have various types of multi-die chip interfaces, and where a system or a portion of a system is organized into logic modules, each dielet may be implemented in a physically different die, and each dielet may have a set of 3D inter-dielet ports (IDPs). In other instances, each dielet may have a set of 2D intra-dielet or within-dielet ports (WDPs). Also, the additional dimensionality information of inter-tier vias (ITVs) may be used to define connections of IDPs across physically different dies (or chips). In some cases, organization across logic modules may be rearranged to optimize the design on one or more of the electrical metrics and/or cost of the design (e.g., including delay, power, area, electrical resources, number of masks and/or reliability). Optimization may be achieved using the description of logic modules available in the unified design database, and also, ITVs may be used to provide electrical connections between separate design blocks across logic modules organized in physically different dies. Further, ITVs may be modified and/or used to explore physical space and wiring resources of some other dies (chips), which may result in improvement of congestion, resistance, electromigration (EM) issues, etc.

The various schemes and techniques described herein may deliver high quality multi-dielet chip interface design methodologies. Advantageously, various schemes and techniques described herein provide for quality-of-results for multi-dielet designs while leveraging electronic design automation (EDA) tools and/or flows based on dielet-specific implementations. As such, the various schemes and techniques described herein provide for supporting high-quality multi-dielet chip design flows.

Various implementations of dielet design techniques will be described in detail herein with reference to FIGS. 1A-6.

Figure 1B:
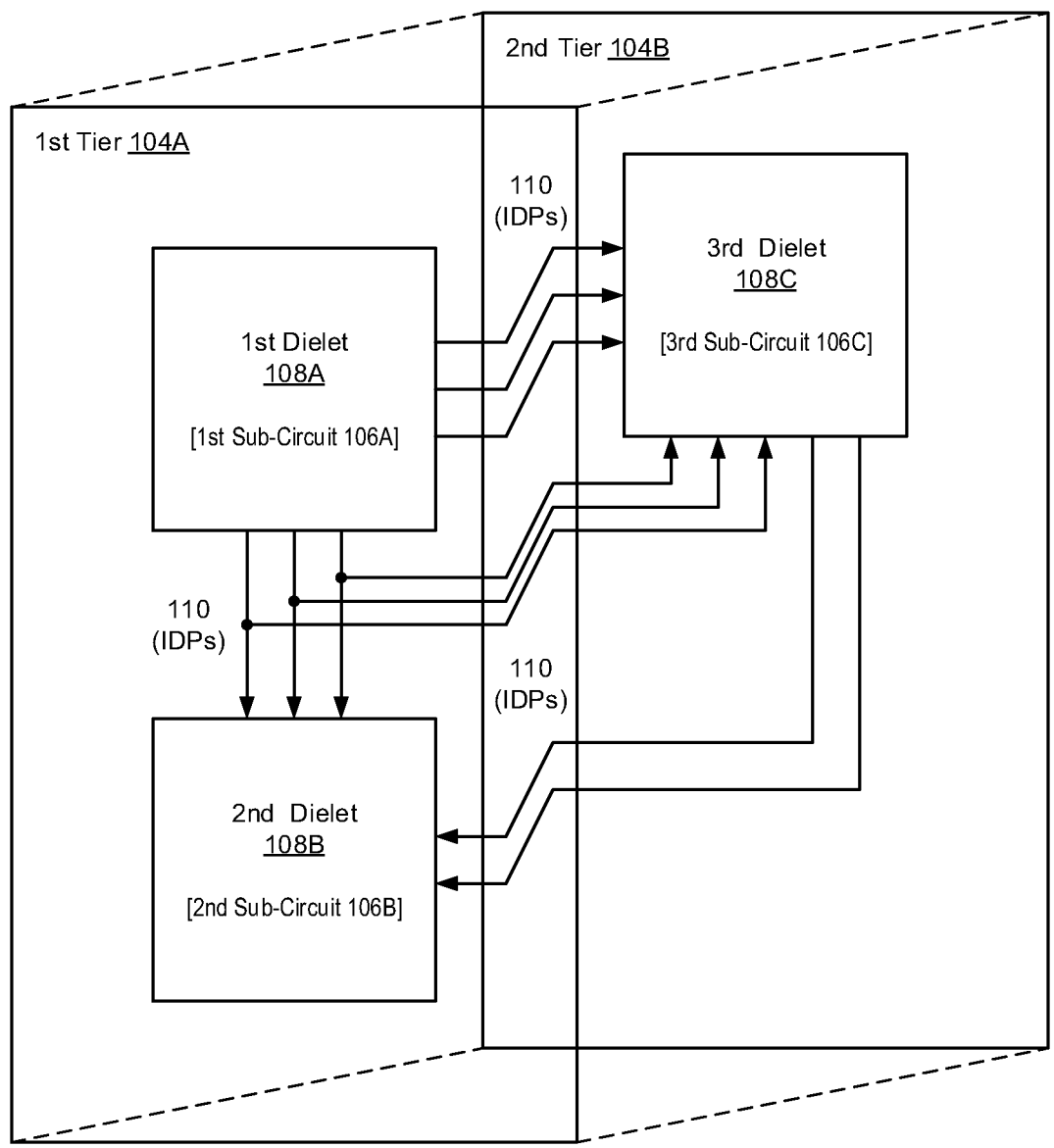
Figure 1C:
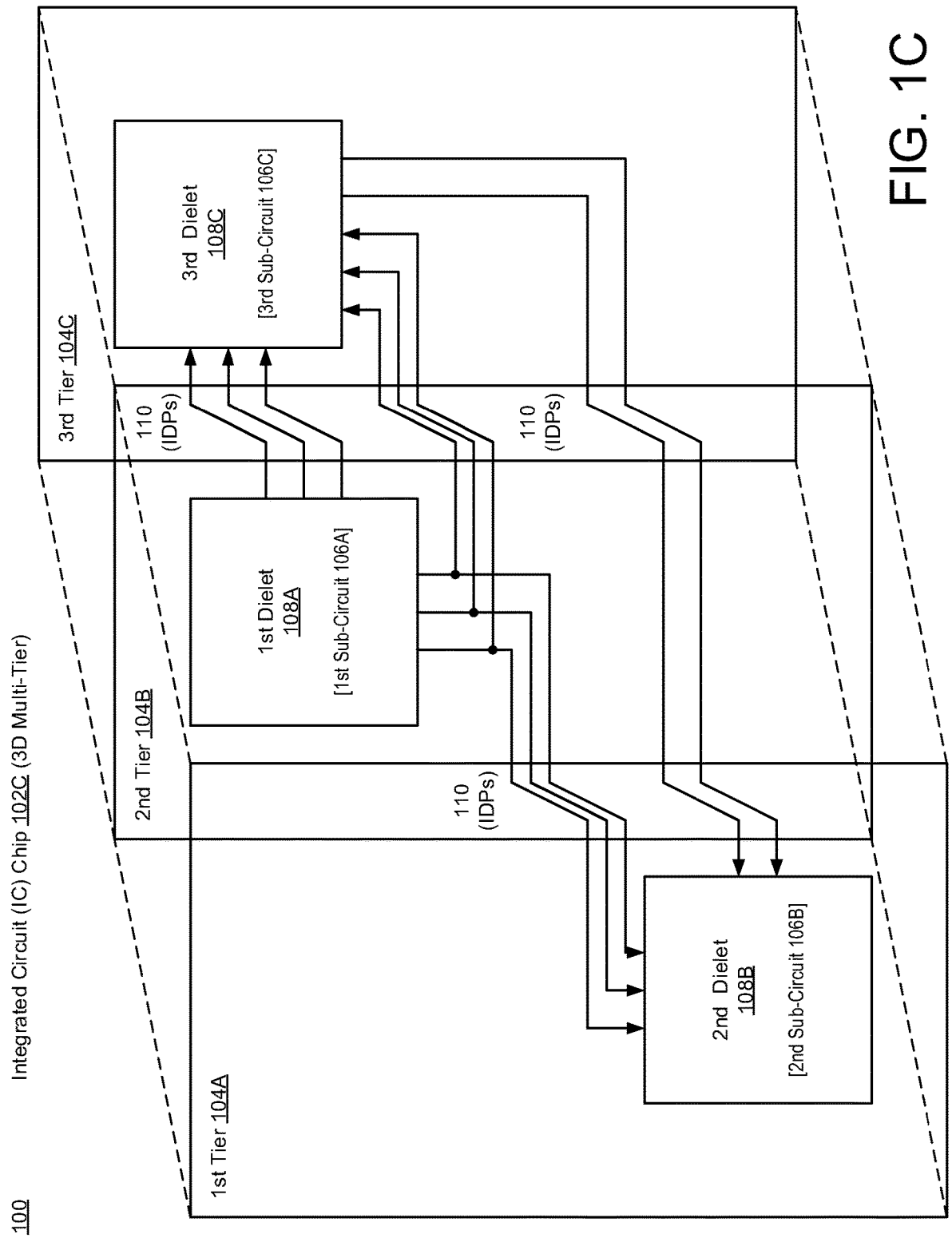

FIGS. 1A-1C illustrate various diagrams of integrated circuitry (IC) 100 having one or more tiers in accordance with various implementations described herein. In some instances, the integrated circuitry 100 may be implemented as a system or device having various circuit components that are arranged and coupled together as an assemblage or combination of parts that provide for a physical circuit design and related structures. Also, in some instances, a method of designing, providing and building the integrated circuitry 100 may involve use of the various circuit components described herein so as to thereby implement dielet design schemes and techniques associated therewith.

In particular, FIG. 1A shows the integrated circuitry 100 as an IC chip or a die 102A having a single tier 104A (i.e., a first tier 104A) in a two-dimensional (2D) single tier configuration. FIG. 1B shows the integrated circuitry 100 as another chip or die 102B having multiple tiers 104A, 104B (i.e., the first tier 104A and a second tier 104B) in a three-dimensional (3D) multi-tier configuration. Also, FIG. 1C shows the integrated circuitry 100 as another chip or die 102C having multiple tiers 104A, 104B, 104C (i.e., the first tier 104A, the second tier 104B and a third tier 104C) in a 3D multi-tier configuration.

As shown in FIG. 1A, the integrated circuitry 100 may include the integrated circuit (IC) chip or semiconductor die 102A having a circuit design that is severable into multiple sub-circuits 106A, 106B, 106C. The integrated circuitry 100 may include multiple dielets 108A, 108B, 108C that are adapted to include the multiple sub-circuits 106A, 106B, 106C. Also, as shown, the integrated circuitry 100 may include multiple physical electrical connections 110 that are adapted to electrically interconnect the multiple sub-circuits 106A, 106B, 106C to operate as the intended circuit design.

In some implementations, the chip or die 102A may be a single semiconductor die, and each dielet of the multiple dielets 108A, 108B, 108C may be a sub-component of the single semiconductor die 102A that is electrically interconnectable to each other sub-component. Also, the multiple dielets 108A, 108B, 108C may include a first dielet 108A, a second dielet 108B, and a third dielet 108C, and the multiple sub-circuits 106A, 106B, 106C may include a first sub-circuit 106A, a second sub-circuit 106B, and a third sub-circuit 106C. In this instance, as shown in FIG. 1A, the first dielet 104A may include the first sub-circuit 106A, the second dielet 104B may include the second sub-circuit 106A, and the third dielet 104C may include the third sub-circuit 106C.

In some implementations, the multiple physical electrical connections 110 may refer to inter-dielet ports (IDPs) that facilitate integration of the multiple sub-circuits 106A, 106B, 106C in the multiple dielets 108A, 108B, 108C on the die 102A. In some instances, as shown in FIG. 1A, the multiple physical electrical connections 110 (IDPs) may include multiple sub-sets of separate conductive paths that electrically interconnect the multiple sub-circuits 106A, 106B, 106C to operate as the intended circuit design. Also, in some instances, each separate conductive path of the multiple sub-sets of separate conductive paths may be used to electrically interconnect one dielet (e.g., 108A) of the multiple dielets to each other dielet (e.g., 108B, 108C) of the multiple dielets.

In some instances, as shown in FIG. 1A, the die 102A may be disposed in the single tier 104A, and the multiple dielets 108A, 108B, 108C may be disposed in the same single tier 104A. In other instances, as shown in FIGS. 1B-1C, the multiple dielets 108A, 108B, 108C may be disposed in multiple tiers (e.g., 104A, 104B, 104C). For instance, as shown in FIG. 1B, the first dielet 108A and the second dielet 108B may be disposed in the first tier 104A, and the third dielet 108C may be disposed in the second tier 104B. Also, in another instance, as shown in FIG. 1C, the first dielet 108A may be disposed in the second tier 104B, the second dielet 108B may be disposed in the first tier 104A, and the third dielet 108C may be disposed in the third tier 104C. In reference to various dielet design techniques described herein, any number of dielets may be used, any number of tiers may be used, and any number of chips or dies may be used.

In various implementations, one or more circuit design portions (and/or various parts) associated with the dies 102A, 102B, 102C may be disposed in any of the multiple tiers, such as, e.g., the first tier 104A, the second tier 104B and/or the third tier 104C. As such, each of the dies 102A, 102B, 102C may be arranged as a device having the first tier 104A, the second tier 104A and/or the third tier 104C. In some instances, the multiple dielets 108A, 108B, 108C may include one or more dielets disposed in the first tier 104A, one or more other dielets disposed in the second tier 104B and/or the third tier 104C that are separate and distinct from the first tier 104A. Also, as shown in FIGS. 1A-1C, the multiple physical electrical connections 110 (IDPs) may be configured to electrically interconnect the multiple sub-circuits 106A, 106B, 106C associated with the multiple dielets 108A, 108B, 108C between the first tier 104A, the second tier 104B and the third tier 104C so as to operate as the intended circuit design.

FIGS. 1A-1C provide examples of multi-dielet chip designs, wherein multiple dielets (e.g., 3 dielets) may be adapted to communicate with each other using inter-dielet connections, and also, each inter-dielet connection may be associated with multiple dielets. In some instances, unified database implementation methodologies may rely on creation of inter-dielet ports (IDPs) with embedded 3D geometric position information. As such, the inter-dielet ports 110 (IDPs) may include 3D position information associated therewith, and also, the circuit design or any portion thereof may be described in the unified design database. In some cases, the integrated circuitry 100 may be implemented with one or more semiconductor dies with various embedded systems for various electronic, mobile and Internet-of-things (IoT) applications, including low power sensor nodes.

Figure 2:
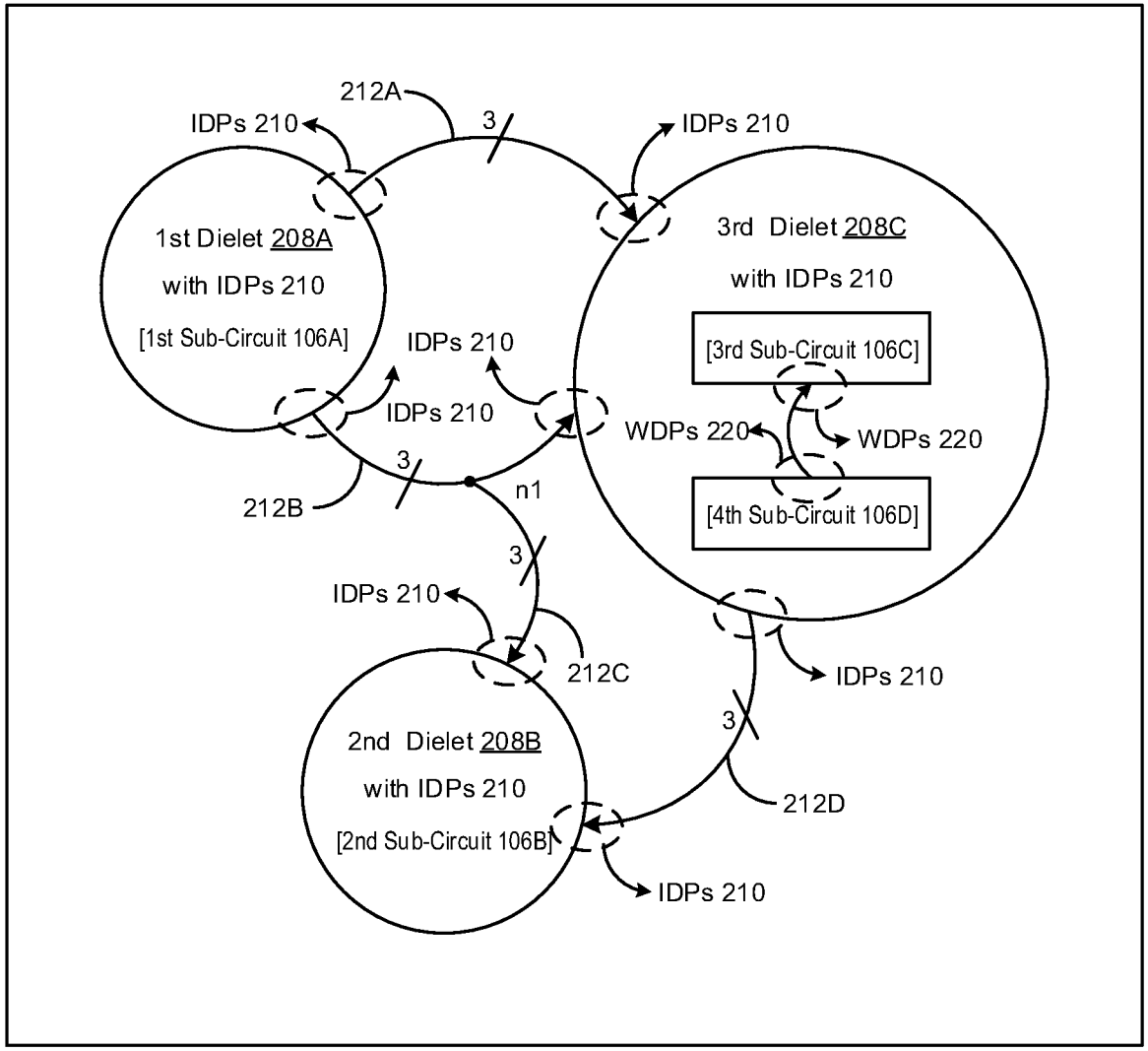
FIG. 2 illustrates a dielet interconnect diagram of an integrated circuit chip in accordance with implementations described herein.

FIG. 2 illustrates a dielet interconnect diagram 200 of an integrated circuit (IC) chip 202 in accordance with various implementations described herein.

As shown in FIG. 2, the inter-dielet ports (IDPs) 210 for multiple dielets 208A, 208B, 208C may be provided within register transfer logic (RTL) hierarchy, which may be organized into logic modules. As described herein, each dielet 208A, 208B, 208C may be implemented in a physically different die and each may have a set of 3D inter-dielet ports (IDPs) 210 and/or 2D within-dielet ports (WDPs) 220. In various implementations, the 3D IDPs 210 may be used to facilitate the integration of the multiple sub-circuits 106A, 106B in multiple dielets (e.g., multiple dielets 208A, 208B), and also, the 2D WDPs 220 may be used to facilitate the integration of the multiple sub-circuits 106C, 106D within the same dielet (e.g., third dielet 208C). At chip level hierarchy, information related to the IC chip or die 202 may include top-level inter-dielet connections or chip-level input/output (I/O) connections. In this instance, each logic module may be implemented separately in a physically different die, and also, the inter-dielet ports (IDPs) 210 may be used to define inter-dielet connections across physically different dies, as shown and described herein below in FIGS. 3A-3B.

Also, in FIG. 2, a representation of an IC chip or die 202 may provide for logic modules that describe the multiple dielets 208A, 208B, 208C in a single 2D tier. As shown, one or more IDPs 210 may be provided for electrically coupling the dielets 208A, 208B, 208C within one or more logic modules associated with the die 202. For instance, the dielets 208A, 208B, 208C may include a first dielet 208A, a second dielet 208B, and a third dielet 208C. In some instances, the first dielet 208A in FIG. 2 corresponds to the first dielet 108A in FIGS. 1A-1C, the second dielet 208B in FIG. 2 corresponds to the second dielet 108B in FIGS. 1A-1C, and the third dielet 208C in FIG. 2 corresponds to the third dielet 108C in FIGS. 1A-1C.

Further, in this instance, one or more IDPs 210 (e.g., 3) may be used to couple the first dielet 208A to the third dielet 208C in a first conductive path set 212A, wherein a conductive path set may include one or more conductive paths. Also, one or more IDPs 210 (e.g., 3) may be used to couple the first dielet 208A to the third dielet 208C in a second conductive path set 212B and to the second dielet 208B in a third conductive path set 212C via node (n1). Also, one or more IDPs 210 (e.g., 3) may be used to couple the third dielet 208C to the second dielet 208D in a fourth conductive path set 212D. In various instances, any number of IDPs may be used to interconnect multiple dielets.

Figure 3A:
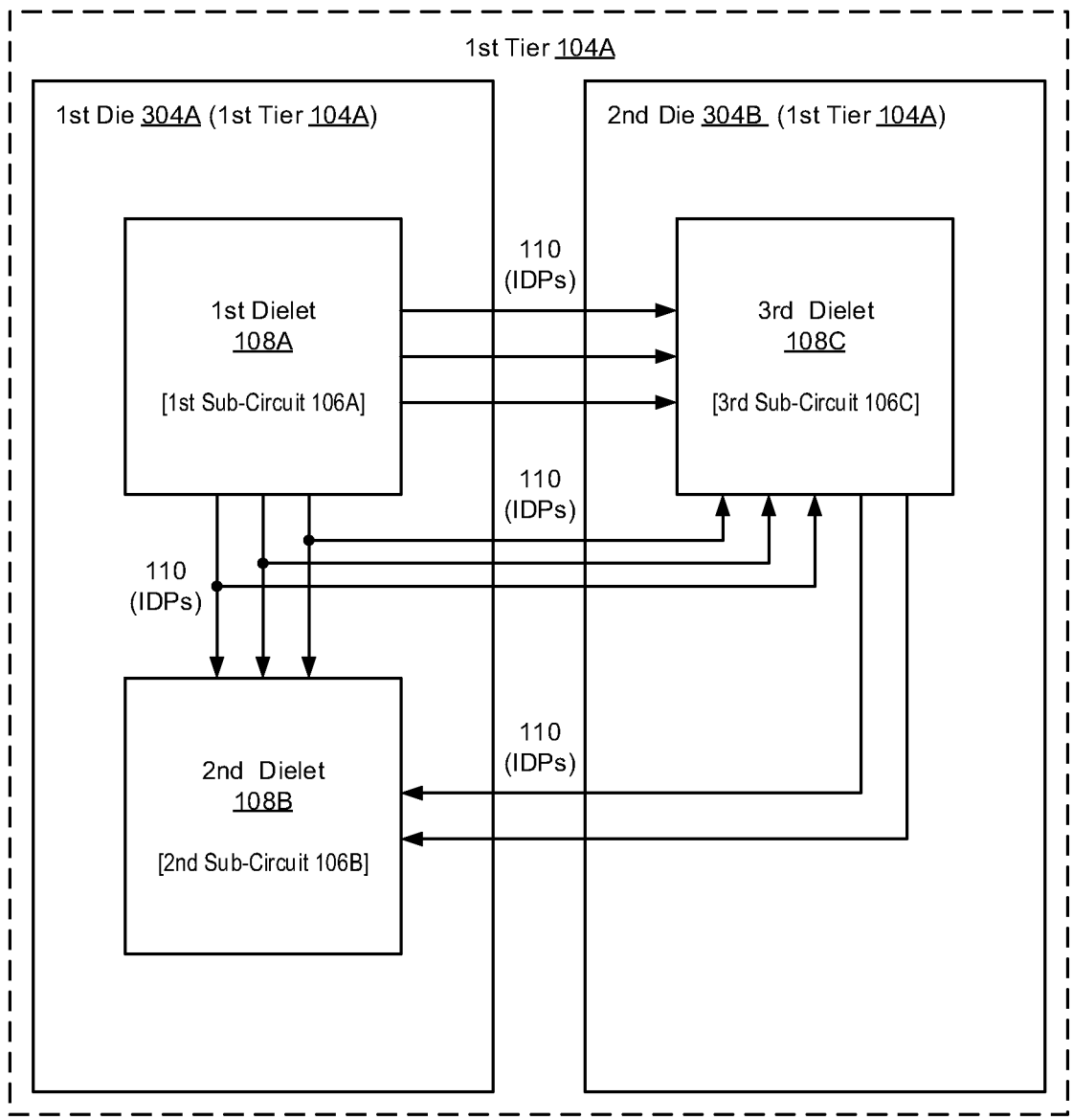
FIGS. 3A-3B illustrate various diagrams of multiple integrated circuit chips in accordance with implementations described herein.
Figure 3B:
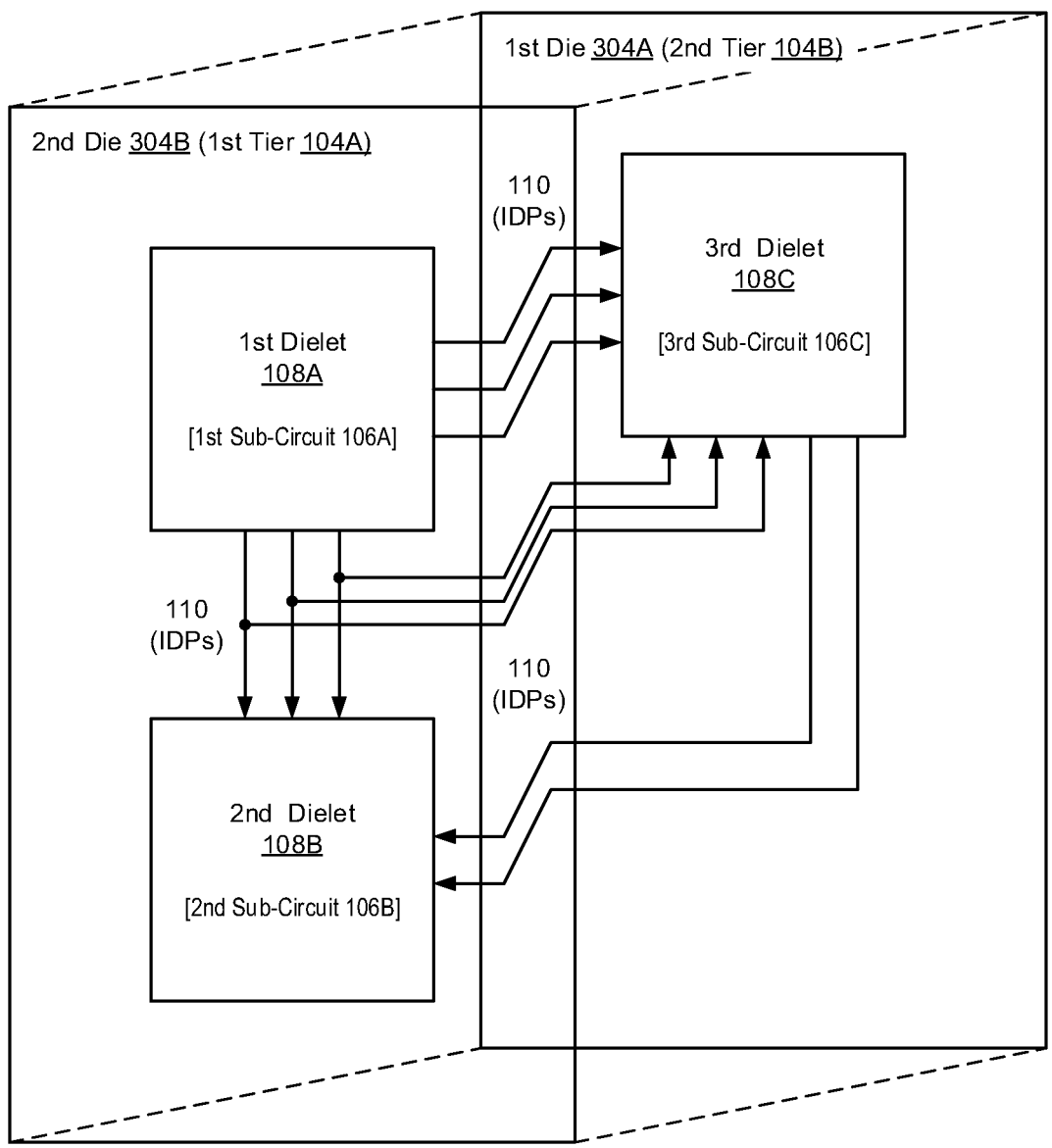

FIGS. 3A-3B illustrate various diagrams of multiple integrated circuit chips 100 in accordance with various implementations described herein.

In some implementations, as described herein, the integrated circuitry 100 may be implemented as a system of multiple chips or dies having various circuit components that are arranged and coupled together as an assemblage or combination of parts that provide for a physical circuit design and related structures. Also, as described herein, a method of designing, providing and building the integrated circuitry 100 may involve the use of various circuit components described herein so as to thereby implement dielet design schemes and techniques associated therewith.

In particular, FIG. 3A shows the integrated circuitry 100 as multiple IC chips or dies 302A in a 2D single tier configuration, and FIG. 3B shows the integrated circuitry 100 as multiple IC chips or dies 302B in a 3D multi-tier configuration. As such, the multiple inter-dielet ports 110 (IDPs) may include 2D and/or 3D geometric position information associated therewith, and in reference to the integrated circuitry 100, the circuit design or any part thereof may be described in a unified design database.

As shown in FIG. 3A, the integrated circuit 100 may include multiple IC chips or dies 302A including, e.g., a first die 304A and a second die 304B, in a 2D single tier configuration. As such, in some instances, the first die 304A may be disposed in the first tier 104A, and the second die 304B may also be disposed in the first tier 104A. Also, in some instances, the first dielet 108A and the second dielet 108B may be disposed on the first die 304A in the first tier 104A, and the third dielet 108C may be disposed on the second die 304B in the first tier 104A. In various instances, any number of dielets may be used, any number of tiers may be used, and any number of chips or dies may be used to implement various physical circuit designs in a unified database.

The first die 304A may refer to a circuit design that is severable into the multiple dielets 108A, 108B, 108C. As shown, the first die 304A may include one or more dielets, such as, e.g., the first dielet 108A and the second dielet 108B. The second die 304B may be physically separate from the first die 304A, and the second die 304B includes at least one of the multiple dielets, such as, e.g., the third dielet 108C. Also, as shown, the multiple inter-dielet ports 110 (IDPs) facilitate integration of a circuit design with the multiple dielets 108A, 108B, 108C disposed on the first die 304A and on the second die 304B.

As shown in FIG. 3B, the integrated circuit 100 may include multiple IC chips or dies 302B including, e.g., a first die 304A and a second die 304B, in the 3D multi-tier configuration. As such, the second die 304B may be disposed in the first tier 104A, and the first die 304A may be disposed in the second tier 104B. Also, in some instances, the first dielet 108A and the second dielet 108B may be disposed on the second die 304B in the first tier 104A, and the third dielet 108C may be disposed on the first die 304A in the second tier 104B. Also, as shown in FIG. 3B, the multiple inter-dielet ports 110 (IDPs) facilitate integration of the circuit design in multiple tiers 104A, 104B and with the multiple dielets 108A, 108B, 108C disposed on the first die 304A and on the second die 304B.

In some implementations, as described herein, the multiple dielets 108A, 108B, 108C may include the multiple sub-circuits 106A, 106B, 106C, and the multiple inter-dielet ports 110 (IDPs) are used to define I/O ports, and physical electrical connections are adapted to electrically interconnect IDPs 110 of the multiple sub-circuits 106A, 106B, 106C disposed on the first die 304A and on the second die 304B in the multiple tiers 104A, 104B. In some cases, the multiple inter-dielet ports 110 (IDPs) may have 3D information associated therewith. Also, the circuit design or a portion thereof may be described in a unified design database.

Figure 4:
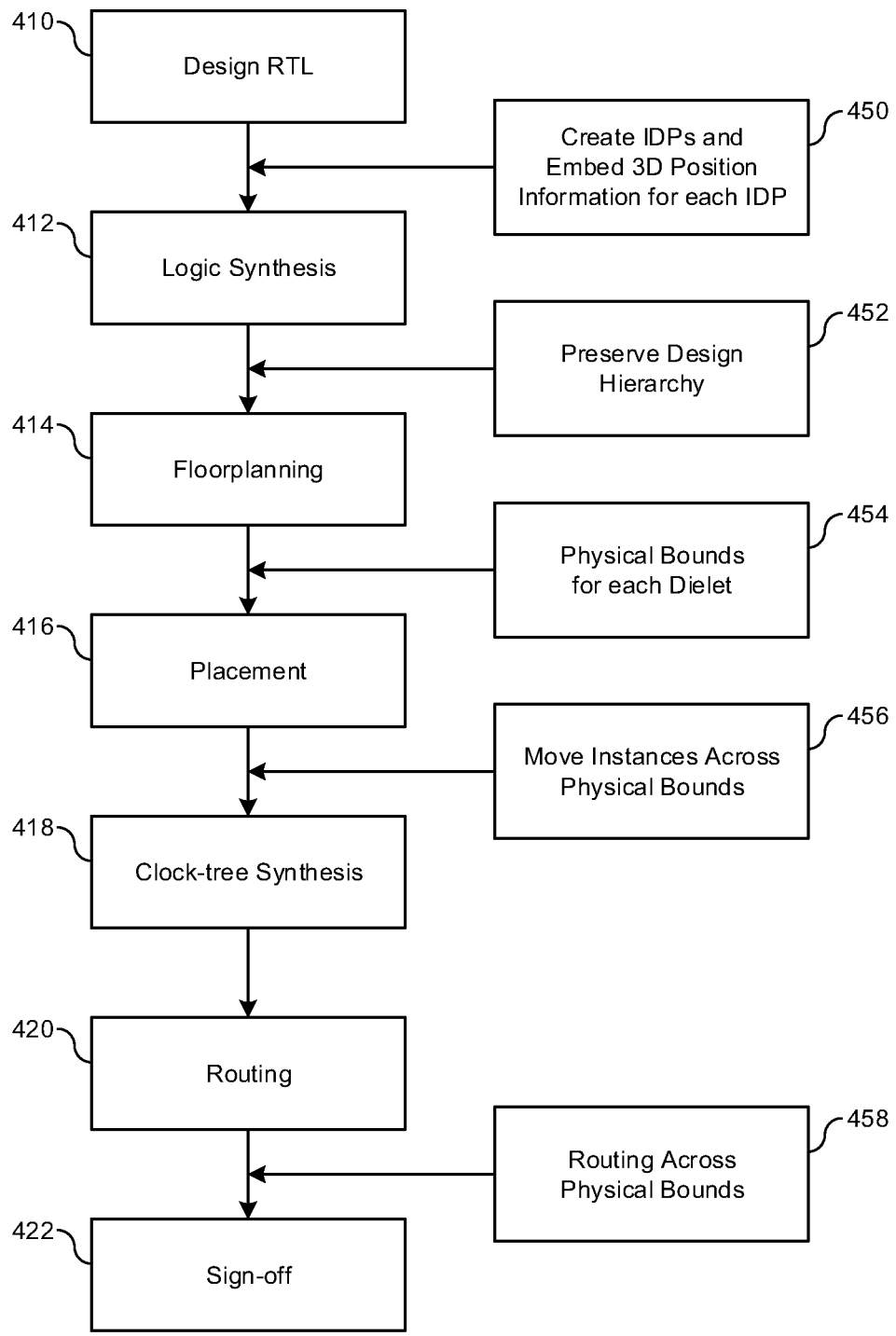
FIGS. 4-5 illustrate process flow diagrams of various methods for providing an integrated circuit chip having one or more tiers in accordance with implementations described herein.
Figure 5:
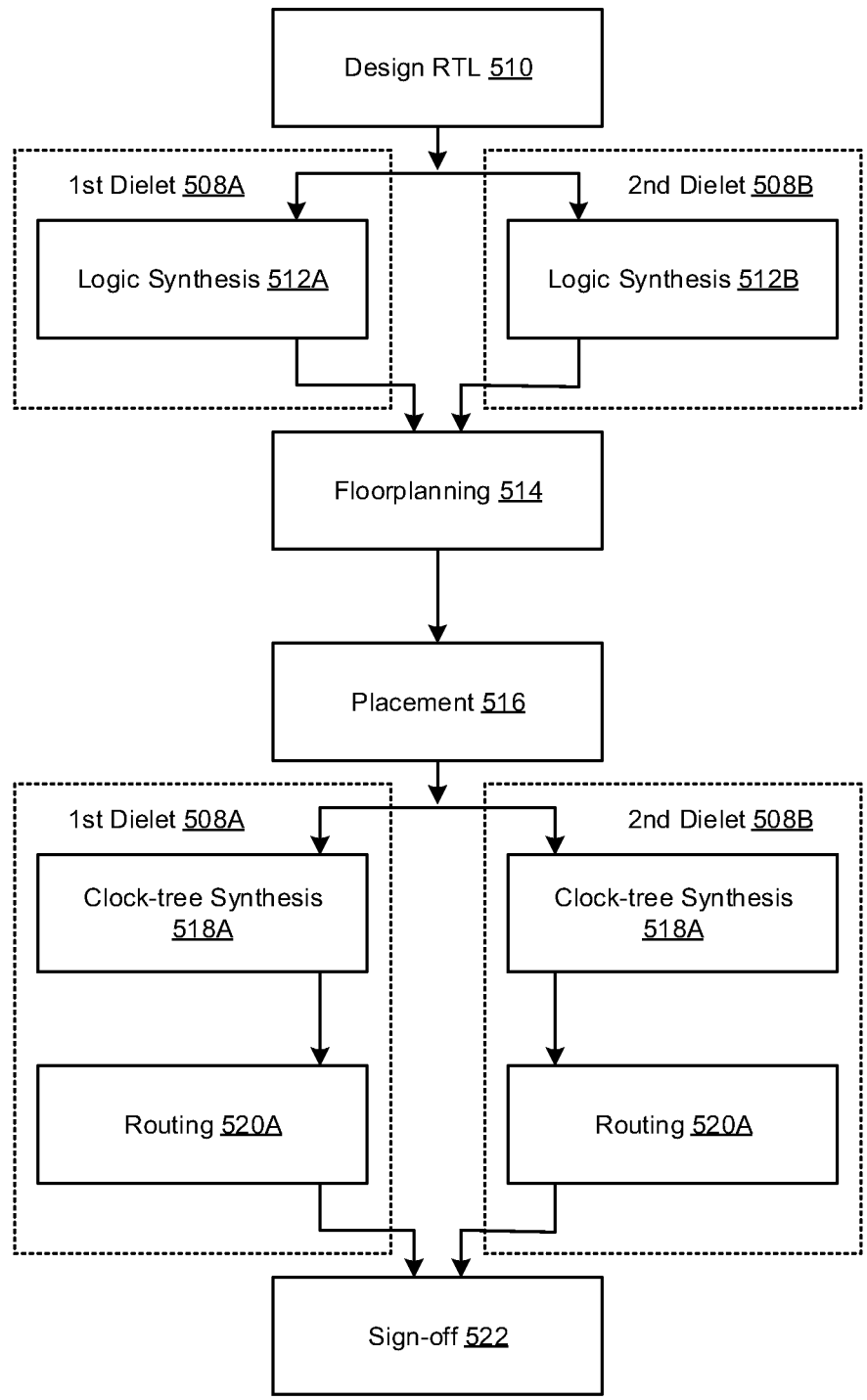

FIGS. 4-5 illustrate process flow diagrams of various methods for providing an integrated circuit chip having one or more tiers in accordance with implementations described herein. In particular, FIG. 4 shows a process flow diagram of a method 400 for providing an integrated circuit chip having one or more tiers, and also FIG. 5 shows another process flow diagram of another method 500 for providing an integrated circuit chip having one or more tiers.

FIG. 4 illustrates a process diagram of a method 400 for providing integrated circuitry in accordance with various implementations described herein. In some implementations, method 400 may be used to create (or generate, or fabricate) integrated circuitry, such as, e.g., various types of memory circuits or similar.

It should be understood that even though method 400 may indicate a particular order of operation execution, in some cases, various certain portions of the operations may be executed in a different order, and on different systems. In other cases, additional operations and/or steps may be added to and/or omitted from method 400. Also, method 400 may be implemented in hardware and/or software. If implemented in hardware, the method 400 may be implemented with various circuit elements, such as described herein above in reference to FIGS. 1A-3B. If implemented in software, the method 400 may be implemented as a program and/or software instruction process that may be configured for providing dielet design techniques as described herein. If implemented in software, instructions related to implementing the method 400 may be stored in memory and/or a database. For instance, a computer or various other types of computing devices having a processor and memory may be configured to perform method 400.

As described and shown in reference to FIG. 4, method 400 may be used for designing, creating, routing, fabricating and/or manufacturing an integrated circuit (IC) that implements the various dielet design schemes and techniques described herein. Also, in reference to FIG. 4, method 400 may be configured to translate the physical design of an integrated circuit while preserving logical behaviors and characteristics.

At block 410, method 400 may provide the register transfer logic (RTL) design, and at block 412, method 400 may provide for logic synthesis. In reference to the dielet design schemes and techniques described herein, at block 450, method 400 may create IDPs and embed 3D position information for each IDP. At block 414, method 400 may provide for floorplanning. In reference to dielet design schemes and techniques described herein, at block 452, method 400 may preserve design hierarchy. At block 416, method 400 may provide for placement of the design, and final placement may be represented in 2D and/or 3D geometric space. In reference to dielet design schemes and techniques described herein, at block 454, method 400 may provide physical bounds for each dielet. At block 418, method 400 may provide for clock-tree synthesis. In reference to the dielet design schemes and techniques described herein, at block 456, method 400 may move instances across physical bounds. At block 420, method 400 may provide for routing of the design. In reference to the dielet design schemes and techniques described herein, at block 458, method 400 may provide for routing across physical bounds. Also, at block 422, method 400 may sign-off and terminate.

In some implementations, the definition of IDPs and logic modules may enable the unified database implementation process flow shown in FIG. 4. In this instance, the physical design including the multiple dielets and inter-dielet connections may be optimized concurrently across one or more or all design stages (e.g., from the RTL design to the sign-off). Thus, in some instances, EDA tools may be used to capture the physical design space of the multi-dielet chip design, e.g., by seeing through the logic connectivity across one or more or all design instances among the multiple dielets.

Further, in reference to the design RTL, EDA tools may be used to create IDPs and associated logic modules, and/or RTL designers may intentionally force a hierarchy during RTL code development. Also, 3D position information may be embedded into each IDP component. In reference to logic synthesis, design hierarchy may be preserved, and in reference to floorplanning, each dielet implementation may be physically bound and/or physically separate. Also, in reference to placement, the inter-dielet connections may be treated differently from the within-dielet connections, and instances may be moved across physical bounds for improved utilization of physical space. The modelling of inter-dielet connections may depend on the multi-dielet chip interface of interest. For instance, in reference to 3D IC design, each dielet may become a tier, and inter-dielet connections may become inter-tier vias. In reference to routing, any routing resources may be shared across different dielets, and in some instances, routing may cross physical bounds to reduce routing congestion.

FIG. 5 illustrates a process diagram of a method 500 for providing integrated circuitry in accordance with various implementations described herein.

It should be understood that even though method 500 may indicate a particular order of operation execution, in some cases, various certain portions of the operations may be executed in a different order, and on different systems. In other cases, additional operations and/or steps may be added to and/or omitted from method 500. Also, method 500 may be implemented in hardware and/or software. If implemented in hardware, the method 500 may be implemented with various circuit elements, such as described herein above in reference to FIGS. 1A-4. If implemented in software, the method 500 may be implemented as a program and/or software instruction process that may be configured for providing dielet design techniques as described herein. Also, if implemented in software, instructions related to implementing the method 500 may be stored in memory and/or a database. For instance, a computer or various other types of computing devices having a processor and memory may be configured to perform method 500.

As described and shown in reference to FIG. 5, method 500 may be used for designing, creating, routing, fabricating and/or manufacturing an integrated circuit (IC) that implements the various dielet design schemes and techniques described herein.

At block 510, method 500 may provide the register transfer logic (RTL) design, and at blocks 512A and 512B, method 500 may provide for logic synthesis. In reference to dielet design schemes and techniques described herein, at block 512A, method 500 may provide for logic synthesis of a first dielet 508A, and at block 512B, method 500 may provide for logic synthesis of a second dielet 508B. At block 514, method 500 may provide for floorplanning, and at block 516, method 500 may provide for placement of the design. At blocks 518A and 518B, method 500 may provide for clock-tree synthesis. In reference to dielet design schemes and techniques described herein, at block 518A, method 500 may provide for clock-tree synthesis of the first dielet 508A, and at block 518B, method 500 may provide for clock-tree synthesis of the second dielet 508B. At blocks 520A and 520B, method 500 may provide for routing of the design. In reference to the dielet design schemes and techniques described herein, at block 520A, method 500 may provide for routing of the design of the first dielet 508A, and block 520B, method 500 may provide for routing of the design of the second dielet 508B. At block 522, method 500 may sign-off terminate. Also, in reference to FIG. 5, method 500 may be configured to translate the physical design while preserving logical behaviors and characteristics.

In some instances, the unified database-based implementation methodologies described herein may be compatible with a standard flow of EDA systems, and output of method 500 may be ported into the standard flow from EDA systems, and vice versa. In FIG. 5, the design RTL may be separated into dielet-specific implementations for logic synthesis, and the design RTL may be re-assembled into a unified database for additional processing, such as, e.g., floorplanning and placement, after which the unified database may be separated into dielet-specific implementations for clock tree synthesis (CTS) and routing. Also, the physical design may then be assembled for signoff. In some instances, FIG. 5 refers to an example that integrates concepts of a unified database into standard EDA process flows. With the dielet design schemes and techniques described herein, a unified database may be separated into multiple dielet-specific implementations and/or assemble multiple dielet-specific implementations into a unified database at one or more or any or all design stages, or in some relevant combination thereof.

Figure 6:
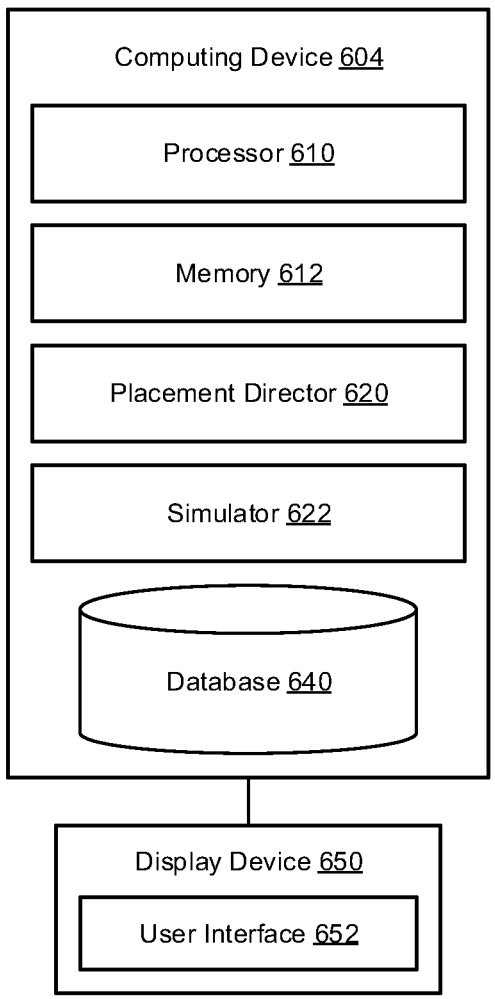
FIG. 6 illustrates a diagram of a system for providing an integrated circuit chip in physical design in accordance with implementations described herein.

FIG. 6 illustrates a diagram of a system 600 for providing an integrated circuit chip in physical design in accordance with implementations described herein.

In reference to FIG. 6, the system 600 may be associated with at least one computing device 604 that is implemented as a special purpose machine configured for implementing dielet schemes and techniques in physical design, as described herein. In some instances, the computing device 604 may include any standard element(s) and/or component(s), including at least one processor(s) 610, memory 612 (e.g., non-transitory computer-readable storage medium), one or more database(s) 640, power, peripherals, and various other computing elements and/or components that may not be specifically shown in FIG. 6. The computing device 604 may include instructions recorded or stored on the non-transitory computer-readable medium 612 that are executable by the at least one processor 610. The computing device 604 may be associated with a display device 650 (e.g., a monitor or other display) that may be used to provide a user interface (UI) 652, such as, e.g., a graphical user interface (GUI). In some instances, the UI 652 may be used to receive various parameters and/or preferences from a user for managing, operating, and/or controlling the computing device 604. Thus, the computing device 604 may include the display device 650 for providing output to a user, and the display device 650 may include the UI 652 for receiving input from the user.

In reference to FIG. 6, the computing device 604 may include a placement director 620 that may be configured to cause the at least one processor 610 to implement one or more or all dielet design schemes and techniques described herein in reference to FIGS. 1A-5, including dielet design schemes and techniques related to implementing integrated circuitry in physical design. The placement director 620 may be implemented in hardware and/or software. For instance, if implemented in software, the placement director 620 may be stored in memory 612 or database 640. Also, in some instances, if implemented in hardware, the placement director 620 may be a separate processing component configured to interface with the processor 610.

In some instances, the placement director 620 may be configured to cause the at least one processor 610 to perform various operations, as provided herein in reference to dielet design schemes and techniques described in FIGS. 1A-5. In this instance, the memory 612 has stored thereon instructions that, when executed by the processor 610, cause the processor 610 to perform one or more or all of the following operations.

For instance, the placement director 620 may be configured to cause the at least one processor 610 to perform a method operation of sub-dividing a circuit design of one or more dies into multiple sub-circuits. The die may be a single semiconductor die, and the die may have one or more tiers. In other instances, the die may refer to a multi-die configuration that includes two or more separate dies in physical design.

The placement director 620 may be configured to cause the at least one processor 610 to perform a method operation of forming multiple dielets to include the multiple sub-circuits. For instance, in some instances, the multiple dielets may include a first dielet, a second dielet, and a third dielet, and also, each dielet of the multiple dielets may be a sub-component (or have a sub-circuit) of the single semiconductor die that is electrically interconnectable to each other sub-component (or sub-circuit). Thus, in some instances, the multiple sub-circuits may include a first sub-circuit, a second sub-circuit, and a third sub-circuit. Also, in this instance, the first dielet includes the first sub-circuit, the second dielet includes the second sub-circuit, and the third dielet includes the third sub-circuit. In addition, the multiple dielets may be disposed in one or more tiers.

The placement director 620 may be configured to cause the at least one processor 610 to perform a method operation of electrically interconnecting the multiple sub-circuits with multiple physical electrical connections so as to cause the multiple sub-circuits to operate as the circuit design. In some instances, the multiple physical electrical connections may include multiple sub-sets of separate conductive paths that electrically interconnect the multiple sub-circuits to operate as the circuit design. Also, each separate conductive path of the multiple sub-sets of separate conductive paths may electrically interconnect one dielet of the multiple dielets to each other dielet of the multiple dielets.

In some implementations, the multiple dielets may include one or more dielets disposed in a first tier, and also the multiple dielets may include one or more other dielets disposed in a second tier that is separate from the first tier. In some instances, the multiple physical electrical connections may be configured to electrically interconnect the multiple sub-circuits associated with the multiple dielets between the first tier and the second tier so as to operate as the circuit design. In accordance with various dielet design techniques described herein, any number of dielets may be used, any number of tiers may be used, and any number of chips or dies may be used to implement a physical design.

In accordance with various implementations described herein in reference to FIGS. 1A-5, any one or more or all of these operations performed by the placement director 620 may be altered, modified, or changed to thereby provide the various specific embodiments as shown in FIGS. 1A-5. Further, each of the dielets may be in a form of a logic block or module having a set of shapes with width and space definitions, and the logic block or module may comprise a physical structure associated with the integrated circuit that is included in a place and route environment for EDA.

Further, in reference to FIG. 6, the computing device 604 may include a simulator 622 that is configured to cause the at least one processor 610 to generate one or more simulations of the integrated circuitry. The simulator 622 may be referred to as a simulating component and may be implemented in hardware or software. If implemented in software, the simulator 622 may be recorded or stored in memory 612 or database 640. If implemented in hardware, the simulator 620 may be a separate processing component configured to interface with the processor 610. In some instances, the simulator 622 may be a SPICE simulator that is configured to generate SPICE simulations of the integrated circuitry. Generally, SPICE is an acronym for Simulation Program with Integrated Circuit Emphasis, which is an open source analog electronic circuit simulator. Also, SPICE may refer to a general-purpose software program used by the semiconductor industry to check the integrity of integrated circuit designs and to predict the behavior of integrated circuit designs. Thus, in some implementations, the placement director 620 may be configured to interface with the simulator 622 so as to generate various timing data based on one or more simulations (including, e.g., SPICE simulations) of an integrated circuit that may be utilized for analyzing performance characteristics of the integrated circuit including timing data of the integrated circuit. Also, the placement director 620 may be configured to use the one or more simulations (including, e.g., SPICE simulations) of the integrated circuit for evaluating operating behavior and conditions thereof.

In some implementations, the computing device 604 may include one or more databases 640 configured to store and/or record various data and information related to implementing dielet schemes and techniques in physical design. In various instances, the database(s) 640 may be configured to store and/or record data and information related to the integrated circuit, operating conditions, operating behavior and/or timing data. Also, the database(s) 640 may be configured to store data and information related to the integrated circuit and timing data in reference to simulation data (including, e.g., SPICE simulation data).

Described herein are various implementations of a device. The device may include an integrated circuit (IC) having a design that is severable into multiple sub-circuits having input-output (IO) ports. The device may include multiple physical electrical connections that are adapted to electrically interconnect the IO ports of the multiple sub-circuits to operate as the IC. The IO ports have three-dimensional (3D) geometric position information associated therewith.

In some implementations, the 3D geometric position information may include x-y-z coordinates in 3D space. The multiple physical electrical connections may have the 3D geometric position information associated therewith. The IC has gate structures, and the gate structures have the 3D geometric position information associated therewith. The IC may include multiple dies including a first die and second die that is physically separate from the first die, one or more sub-circuits of the multiple sub-circuits of the IC may be disposed on the first die, and one or more other sub-circuits of the multiple sub-circuits of the IC may be disposed on the second die. The IO ports facilitate integration of the multiple sub-circuits disposed on the first die and on the second die. The IC has multiple tiers, and the first die and the second die are on different tiers of the multiple tiers. The multiple physical electrical connections include multiple sub-sets of separate conductive paths that electrically interconnect the multiple sub-circuits to operate as the IC. The IC has multiple tiers, and the multiple sub-circuits are disposed in one or more tiers of the multiple tiers. The design or a portion thereof is described in a unified design database associated with the IC.

Described herein are various implementations of a method. The method may include sub-dividing a design of an integrated circuit (IC) into multiple sub-circuits having input-output (IO) ports. The method may include coupling the IO ports of the multiple sub-circuits with electrical interconnections so as to cause the multiple sub-circuits to operate as the design. The IO ports may have three-dimensional (3D) geometric position information associated therewith. The 3D geometric position information may include x-y-z coordinates in 3D space. The IC has multiple tiers, and the multiple sub-circuits are disposed in one or more tiers of the multiple tiers. The design or a portion thereof may be described in a unified design database associated with the IC.

Described herein are various implementations of a method. The method may include sub-dividing a design of an integrated circuit (IC) into multiple sub-circuits having input-output (IO) ports. The method may include coupling the IO ports of the multiple sub-circuits with electrical interconnections so as to cause the multiple sub-circuits to operate as the design. The electrical connections have three-dimensional (3D) geometric position information associated therewith. The IC has multiple tiers, and the multiple sub-circuits may be disposed in one or more tiers of the multiple tiers. The 3D geometric position information includes x-y-z coordinates in 3D space, and wherein the design or a portion thereof is described in a unified design database associated with the IC.

Described herein are various implementations of a method. The method may include sub-dividing a design of an integrated circuit (IC) into multiple sub-circuits having input-output (IO) ports. The method may include coupling the IO ports of the multiple sub-circuits with electrical interconnections so as to cause the multiple sub-circuits to operate as the design. The IC has gates structures, and the gate structures have three-dimensional (3D) geometric position information associated therewith. The IC may have multiple tiers, and the multiple sub-circuits may be disposed in one or more tiers of the multiple tiers. The 3D geometric position information may include x-y-z coordinates in 3D space, and the design or a portion thereof is described in a unified design database associated with the IC.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device, comprising:
an integrated circuit (IC) having a design that is severable into multiple sub-circuits having input-output (IO) ports, wherein each of the sub-circuits corresponds to a respective dielet; and
multiple physical electrical connections that are adapted to electrically interconnect the IO ports of the multiple sub-circuits to operate as the IC,
wherein the IO ports comprise inter-dielet ports having embedded three-dimensional (3D) geometric position information, and wherein the inter-dielet ports are configured to facilitate integration between the dielets of one or more semiconductor dies.

2. The device of claim 1, wherein the 3D geometric position information includes x-y-z coordinates in 3D space.

3. The device of claim 1, wherein the multiple physical electrical connections have the 3D geometric position information associated therewith.

4. The device of claim 1, wherein the IC has gate structures, and wherein the gate structures have the 3D geometric position information associated therewith.

5. The device of claim 1, wherein:
the IC comprises multiple dies including a first die and a second die of the one or more semiconductor dies, wherein the second die is physically separate from the first die,
one or more sub-circuits of the multiple sub-circuits of the IC are disposed on the first die, and
one or more other sub-circuits of the multiple sub-circuits of the IC are disposed on the second die.

6. The device of claim 5, wherein the 10 ports facilitate integration of the multiple sub-circuits disposed on the first die and on the second die.

7. The device of claim 5, wherein the IC has multiple tiers, and wherein the first die and the second die are on different tiers of the multiple tiers.

8. The device of claim 1, wherein the multiple physical electrical connections include multiple sub-sets of separate conductive paths that electrically interconnect the multiple sub-circuits to operate as the IC.

9. The device of claim 1, wherein the IC has multiple tiers, and wherein the multiple sub-circuits are disposed in one or more tiers of the multiple tiers.

10. The device of claim 1, wherein the design or a portion thereof is described in a unified design database associated with the IC.

11. A method, comprising:
sub-dividing a design of an integrated circuit (IC) into multiple sub-circuits having input-output (IO) ports, wherein each of the sub-circuits corresponds to a respective dielet; and
coupling the IO ports of the multiple sub-circuits with electrical interconnections so as to cause the multiple sub-circuits to operate as the design,
wherein the IO ports comprise inter-dielet ports having embedded three-dimensional (3D) geometric position information, and wherein the inter-dielet ports are configured to facilitate integration between the dielets of one or more semiconductor dies.

12. The method of claim 11, wherein the 3D geometric position information includes x-y-z coordinates in 3D space.

13. The method of claim 11, wherein the IC has multiple tiers, and wherein the multiple sub-circuits are disposed in one or more tiers of the multiple tiers.

14. The method of claim 11, wherein the design or a portion thereof is described in a unified design database associated with the IC.

15. A method, comprising:
sub-dividing a design of an integrated circuit (IC) into multiple sub-circuits having input-output (IO) ports; and
coupling the IO ports of the multiple sub-circuits with electrical interconnections so as to cause the multiple sub-circuits to operate as the design,
wherein the electrical interconnections have embedded three-dimensional (3D) geometric position information.

16. The method of claim 15, wherein the IC has multiple tiers, and wherein the multiple sub-circuits are disposed in one or more tiers of the multiple tiers.

17. The method of claim 15, wherein the 3D geometric position information includes x-y-z coordinates in 3D space, and wherein the design or a portion thereof is described in a unified design database associated with the IC.

18. A method, comprising:
sub-dividing a design of an integrated circuit (IC) into multiple sub-circuits having input-output (IO) ports; and
coupling the IO ports of the multiple sub-circuits with electrical interconnections so as to cause the multiple sub-circuits to operate as the design,
wherein the IC has gate structures associated with the IO ports, and wherein the gate structures have embedded three-dimensional (3D) geometric position information.

19. The method of claim 18, wherein the IC has multiple tiers, and wherein the multiple sub-circuits are disposed in one or more tiers of the multiple tiers.

20. The method of claim 18, wherein the 3D geometric position information includes x-y-z coordinates in 3D space, and wherein the design or a portion thereof is described in a unified design database associated with the IC.

* * * * *